United States Patent [19]

Gordon

[11] Patent Number: 5,785,285
[45] Date of Patent: Jul. 28, 1998

[54] PIPE SUPPORT ASSEMBLY

[75] Inventor: Gary G. Gordon, Southfield, Mich.

[73] Assignee: TRW Inc., Cleveland, Ohio

[21] Appl. No.: 603,447

[22] Filed: Feb. 20, 1996

[51] Int. Cl.$^6$ .................................................. F16L 3/22
[52] U.S. Cl. ................................................. 248/68.1; 74/498
[58] Field of Search ........................ 248/68.1, 69, 67.7, 248/74.1, 74.2, 74.3; 74/422; 180/428

[56] References Cited

U.S. PATENT DOCUMENTS

| | | | |
|---|---|---|---|
| 2,322,753 | 6/1943 | Thomas | 248/68.1 |
| 3,090,826 | 5/1963 | Cochran | 248/74.3 X |
| 3,908,479 | 9/1975 | MacDuff | 74/498 |
| 4,244,544 | 1/1981 | Kornat | 248/74.2 |
| 4,439,876 | 4/1984 | Chalberg | 4/542 |
| 4,669,156 | 6/1987 | Guido et al. | 248/74.3 |
| 4,864,697 | 9/1989 | Sparks et al. | 24/336 |
| 4,899,964 | 2/1990 | Sick | 248/68.1 |
| 4,961,554 | 10/1990 | Smowton | 248/68.1 |
| 4,993,961 | 2/1991 | Hisatomi et al. | 439/125 |
| 5,002,244 | 3/1991 | Holbury et al. | 248/68.1 |
| 5,035,383 | 7/1991 | Rainville | 248/68.1 |
| 5,184,794 | 2/1993 | Saito | 248/68.1 |
| 5,209,441 | 5/1993 | Satoh | 248/68.1 |
| 5,230,496 | 7/1993 | Shillington et al. | 248/316.5 |
| 5,363,539 | 11/1994 | Tisol | 24/543 |
| 5,495,711 | 3/1996 | Kalkman et al. | 60/469 |
| 5,603,279 | 2/1997 | Hundertmark et al. | 114/150 |

*Primary Examiner*—Ramon O. Ramirez
*Assistant Examiner*—Anita King
*Attorney, Agent, or Firm*—Fay, Sharpe, Beall, Fagan, Minnich & McKee

[57] ABSTRACT

Apparatus for securing together a non-linear array of at least three tubes positioned with their longitudinal axes extending parallel comprises a relatively rigid frame carrying first, second, and third cylindrical tube receiving and retaining recesses. Each recess is defined by a separate pair of opposed arms with at least one arm of each pair being resilient and deflectable in a radial direction relative to its respective recess. The arms in each pair have spaced end portions defining an entrance opening to the recess defined thereby. The entrance openings to the second and third of the recesses are generally aligned with tangents to imaginary circles having their center at the center of the first recess and a radius equal to the distance between the center of the first recess and the center of the recess of the respective second or third opening such that the apparatus can be installed by positioning the first tube in the first recess and then rotating the frame about the first tube to engage the second and third tubes into the second and third recesses.

18 Claims, 3 Drawing Sheets

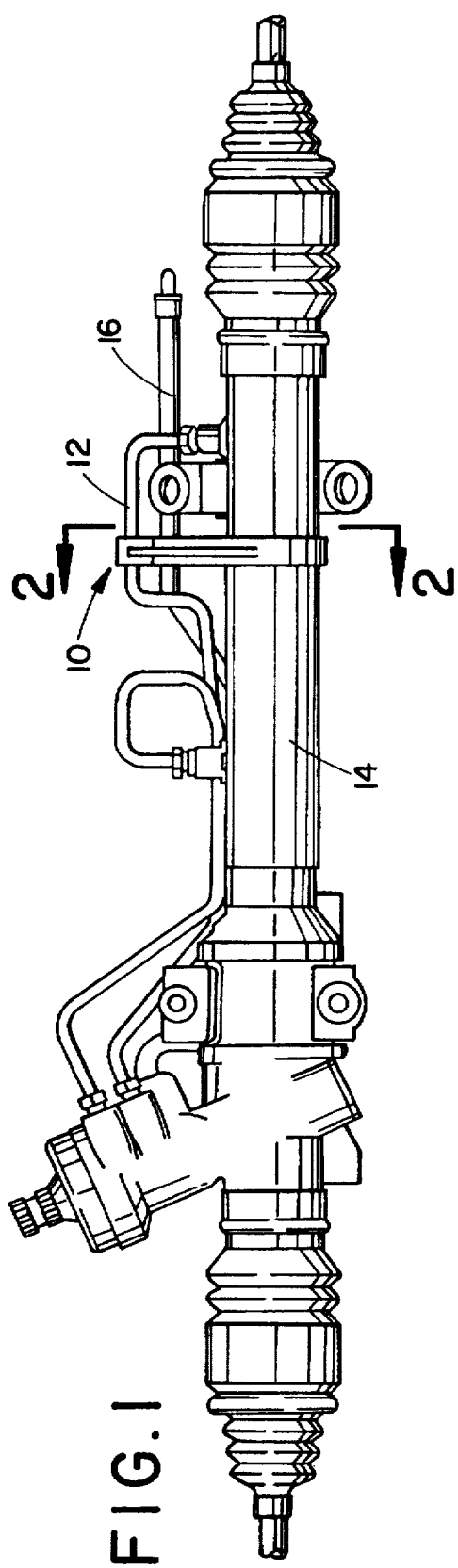
FIG. 1
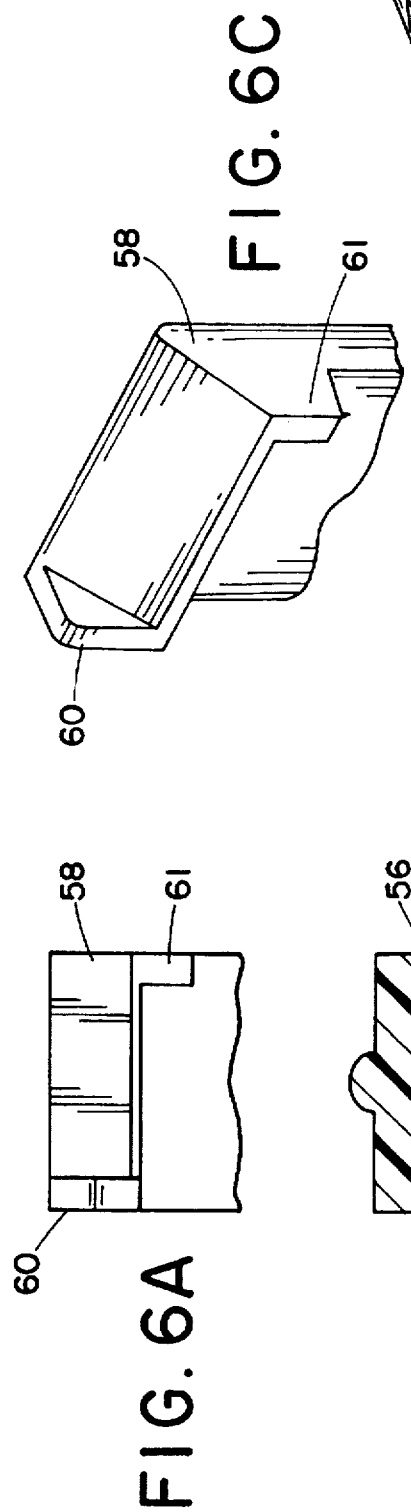
FIG. 6C
FIG. 6D
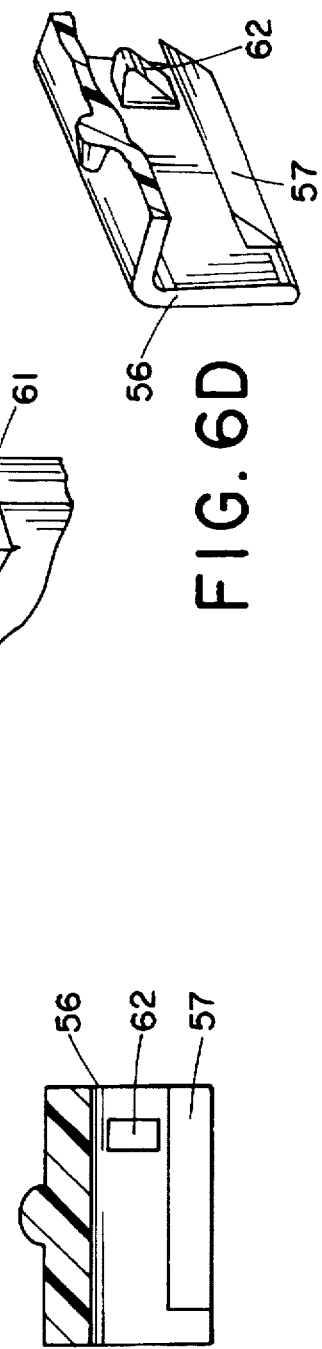
FIG. 6A
FIG. 6B

PIPE SUPPORT ASSEMBLY

BACKGROUND OF THE INVENTION

The subject invention is directed toward the art of pipe and tube supports and, more particularly, to an apparatus for supporting or maintaining a plurality of pipes, tubes, or cable elements in a predetermined spacial orientation.

The invention is especially useful in the motor vehicle art and will be described with reference thereto; however, the invention is capable of broader application and could be used in many environments.

In the motor vehicle art, it is often necessary to provide supports to maintain various pipes and tubes in desired spacial relationships. For example, in certain power steering systems, it is required to support a flexible hydraulic return line from a pair of rigidly mounted tubes including a hydraulic pressure supply line and a rack housing tube.

The tubes are in a relatively cramped, non-linear but parallel spacial relationship that results in difficulties in providing a simple support system that is easy to install. The subject invention, however, provides a support apparatus that can be used in such a situation. It can be formed as a single unitary structure, if desired, and can be manually installed without the use of tools.

SUMMARY OF THE INVENTION

In accordance with the subject invention, apparatus is provided for securing together a non-linear array of at least three tubes positioned with their longitudinal axes extending parallel. The apparatus generally comprises a relatively rigid frame that carries at least first, second, and third cylindrical tube receiving and retaining recesses. Each of the recesses is defined by a separate pair of opposed arms with at least one arm of each pair being resilient so as to be capable of deflecting in a radial direction relative to its respective recess. The arms in each pair have spaced end portions that define entrance openings to the respective recess defined thereby. The entrance openings to the second and third of the recesses are generally aligned with tangents to imaginary circles having their center at the center of the first recess and a radius equal to the distance between the center of the first recess and the center of the recess of the respective second or third opening. The relationship is such that the apparatus can be installed by positioning the first tube in the first recess and then rotating the frame about the first tube to engage the second and third tubes into the second and third recesses.

Preferably, the frame and the opposed arms of each pair of arms are a unitary plastic molding. In addition, it is preferable that each arm in each pair of arms be radially deflectable relative to its respective recess so as to facilitate the entry of the tubes into the recesses and to improve the retention of the tubes therein.

In accordance with a still further aspect of the invention, there are included retaining means that can be manually and selectively moved over the entrance to at least some of the openings to prevent undesired removal of tubes positioned therein. The retaining means preferably include a resilient strap element molded integrally with the frame and having a free end provided with a connecting means for selective connection in the retained position over the associated recess.

In accordance with a more limited aspect of the present invention, a rack and pinion power steering assembly including a rigidly mounted main housing tube with a rigidly mounted hydraulic pressure tube and a flexibly mounted hydraulic return tube extending parallel to the main housing with the axes of the tubes in a triangular array is provided with apparatus for securing and supporting the return tube and the pressure tube to the housing tube. The apparatus comprises a relatively rigid frame carrying first, second, and third cylindrical tube receiving and retaining recesses. Each recess is defined by a separate pair of opposed arms with at least one arm of each pair being resilient and deflectable in a radial direction relative to its respective recess. The arms in each pair have spaced end portions defining an entrance opening to the recess defined thereby. The entrance openings to the second and third of the recesses are generally aligned with tangents to imaginary circles having their center at the center of the first recess and a radius equal to the distance between the center of the first recess and the center of the recess of the respective second or third opening. The openings are oriented such that the apparatus can be installed by positioning the pressure tube in the first recess and then rotating the frame about the pressure tube to position the housing tube and return tube into the second and third recesses, respectively.

The apparatus allows rapid and simple installation onto the tubing array merely by inserting one of the tubes into the first recess and then rotating to bring the second and the third tubes into their located position. The simple rotation is possible because of the location of the entrance openings relative to the center of the first recess. In addition, it is possible to select the tubes to which the first and second recesses are attached so that the third and final tube could be a flexible or non-rigidly mounted tube that is supported from the first two rigid tubes.

As can be appreciated, the entire assembly including the flexible arms can be a simple molding made from any suitable plastic or resinous material, such as nylon, polyethylene, or the like.

As can be seen from the foregoing, a primary object of the invention is the provision of a pipe support assembly which is specially adapted for use in cramped, closely spaced tubing arrangements.

A further object of the invention is the provision of a pipe support assembly which can be readily installed manually using a simple rotating operation.

Another object of the invention is the provision of a pipe clip assembly that is capable of providing vibration dampening.

A further object of the invention is the provision of an apparatus of the type described which is relatively inexpensive to manufacture and install.

Still other advantages and benefits of the invention will become apparent to those skilled in the art upon a reading and understanding of the following detailed description.

BRIEF DESCRIPTION OF THE DRAWINGS

The invention may take physical form in certain parts and arrangements of parts, a preferred embodiment of which will be described in detail in this specification and illustrated in the accompanying drawings which form a part hereof, and wherein:

FIG. 1 is a plan view of a rack and pinion power steering assembly with a pipe support apparatus formed in accordance with the invention incorporated therein;

FIGS. 6A and 6B are partial cross-sectional views taken on lines 6A—6A and 6B—6B, respectively, of FIG. 6;

FIG. 6C is an isometric view of the FIG. 6A structure taken from above and to the right; and, FIG. 6D is an isometric view of the FIG. 6B structure taken from above and to the left.

DETAILED DESCRIPTION OF THE PREFERRED EMBODIMENT

Figure 2:
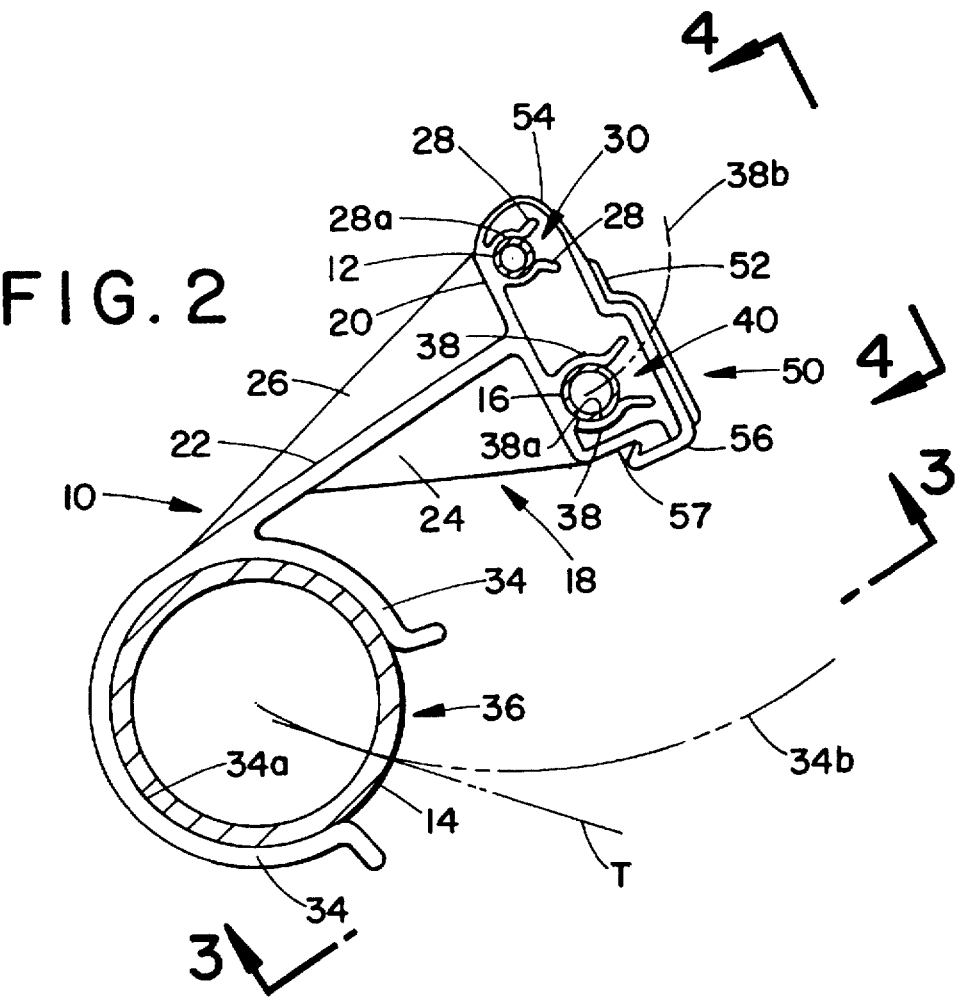
FIG. 2 is a cross-sectional view taken on line 2—2 of FIG. 1.
Figure 4:
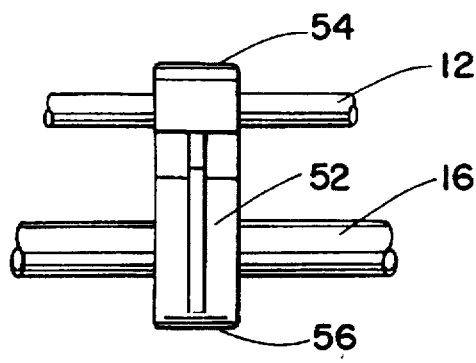
FIG. 4 is a view taken on line 4—4 of FIG. 2.
Figure 3:
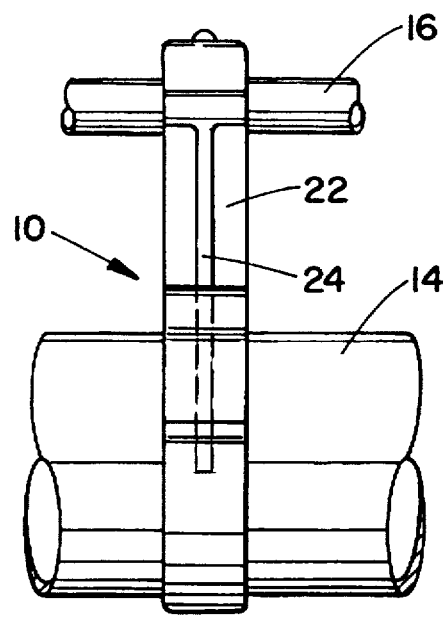
FIG. 3 is a view taken on line 3—3 of FIG. 2.

Referring now to the drawings wherein the showings are for the purposes of illustrating the preferred embodiment of the invention only and not for purposes of limiting same, FIGS. 1 through 4 best illustrate the overall arrangement of a rack and pinion power steering gear unit A that has a pipe support apparatus 10 associated therewith that is arranged so as to engage with and maintain in a desired spacial orientation pipe and tube elements of the unit A. In the specific embodiment illustrated, the unit A includes three of the tubes, two of which are rigidly mounted relative to one another, and a third which is flexible or movable relative to the other two. Specifically, a first tube 12 is a hydraulic pressure line of relatively small diameter and that is rigidly mounted in a spaced relationship from a second, somewhat larger diameter and rigidly mounted housing tube 14. A third tube 16 is of an intermediate diameter and is a flexibly mounted hydraulic pressure return line.

The relationship between the tubes 12, 14, and 16 must be maintained in the orientation illustrated with particular emphasis on the supporting and holding of flexibly mounted return line 16. The pipe support apparatus 10 is arranged to perform this function in an effective manner and to allow assembly into the installed condition simply and without the use of tools.

In the preferred form, the support apparatus 10 generally comprises a main frame 18 that includes a first web member 20 joined in a somewhat T-shaped relationship to a main connecting web 22. Suitable integrally formed triangular reinforced webs 24 and 26 are located on opposite sides of the main web 22 and join with the first web 20. This provides a relatively rigid main frame of triangular configuration.

The main frame 18 carries a plurality of arm members located in cooperating pairs so as to define suitable cylindrical tube receiving and retaining recesses for engaging about and holding the respective tube members 12, 14, and 16. In particular, a first pair of resilient arms 28 extend outwardly from the web member 20 at its left-hand side as viewed in FIG. 2. These resilient arms 28 are spaced and formed so as to tightly grip the outer periphery of the tube 12. The arms 28 terminate in outer free ends that are spaced apart a distance to define an entrance opening 30 to the cylindrical recess 28a defined thereby. Preferably, the free ends of the arms 28 are inclined or flared as shown so as to provide an inwardly tapered mouth leading to the recess 30. This formation acts to facilitate installation of the tube into the recess 30.

A second pair of resilient arms 34 are carried at the lower end of the main central web 22. These arms are spaced and contoured so as to define the cylindrical tube receiving recess 34a which houses the tube 14. Like the arms 28, the outer free ends of arms 34 are spaced to define a tube receiving entrance opening 36. Here, again, the outer ends of the arms 34 are tapered or flared outwardly so as to define a tapered mouth portion for more ready entry of tube 14 into the recess.

The apparatus 10 further includes a third pair of resilient arms 38 that cooperate to define the cylindrical tube receiving recess 38a for tube 16. The arms 38 are closely similar in their construction and design to the previously discussed arms 28 and 34. In particular, however, it will be noted that they also have free ends that are spaced apart to define an entrance opening 40 for receiving tube 16. The free ends are, as shown, flared outwardly so as to define the tube receiving mouth and allow easy entry of tube 16.

Associated with the arms 28 and 38 is a retaining means 50 that is arranged to provide a selectively and manually operable means for retaining tubes 12, 16 in their respective recesses 28a and 38a. This retaining means 50 could take many forms but is shown as a strap or band member 52 having a rigid body portion arranged to overlie the arms 28, 38 to close their respective entry openings 30, 40. The rigid body portion is preferably integrally joined to the end of web member 20 by a flexible living hinge 54. At the opposite end of rigid body portion 52, there is a latch or catch including a downwardly extending end portion 56 (see FIGS. 6, 6B, and 6D) that terminates in a hook 57. Hook 57 is arranged to engage under an upwardly extending latch arm 58 terminating in a hook (see FIGS. 6, 6A, and 6C). After the tubes 12 and 16 have been inserted into their respective recesses, the retaining means 50 can be moved to the closed position shown in FIG. 2. Lateral stability of the body portion 52 is provided by small triangular tabs 60, 61 that extend in opposite directions from end 58 (see FIGS. 6A and 6C) and engage respectively with the end of hook 57 and a triangular tab 62 carried on the interior of end portion 56 (see FIG. 6B).

As can be appreciated, all of the components thus far described can be formed as a single integral molding formed from a suitable plastic or resinous material as mentioned above.

Of importance to the invention is the relationship of the openings 36 and 40 relative to the first tube member 12 or the recess 28a that houses tube member 12. In particular, according to the subject invention, the entrance openings to the second and third recesses 34a and 38a are arranged so that they generally align with tangents to imaginary circles having their center at the center of the first recess 28a. This is generally illustrated in FIG. 2. Note that the imaginary circle 34b (shown dotted) passes through the center of the recess 34a and is related to the opening 36 such that the opening 36 is generally aligned with the tangent T. Similarly, the recess 38a that houses tube 16 has its opening 40 generally located to be centered on a tangent to the imaginary circle 38b drawn about the center of the recess 28a for tube 12. This particular arrangement greatly facilitates the installation of the apparatus into its located position on the tubes 12 and 14 for thereby supporting tube 16 in its desired position and acting to reduce vibrations thereof.

Figure 5:
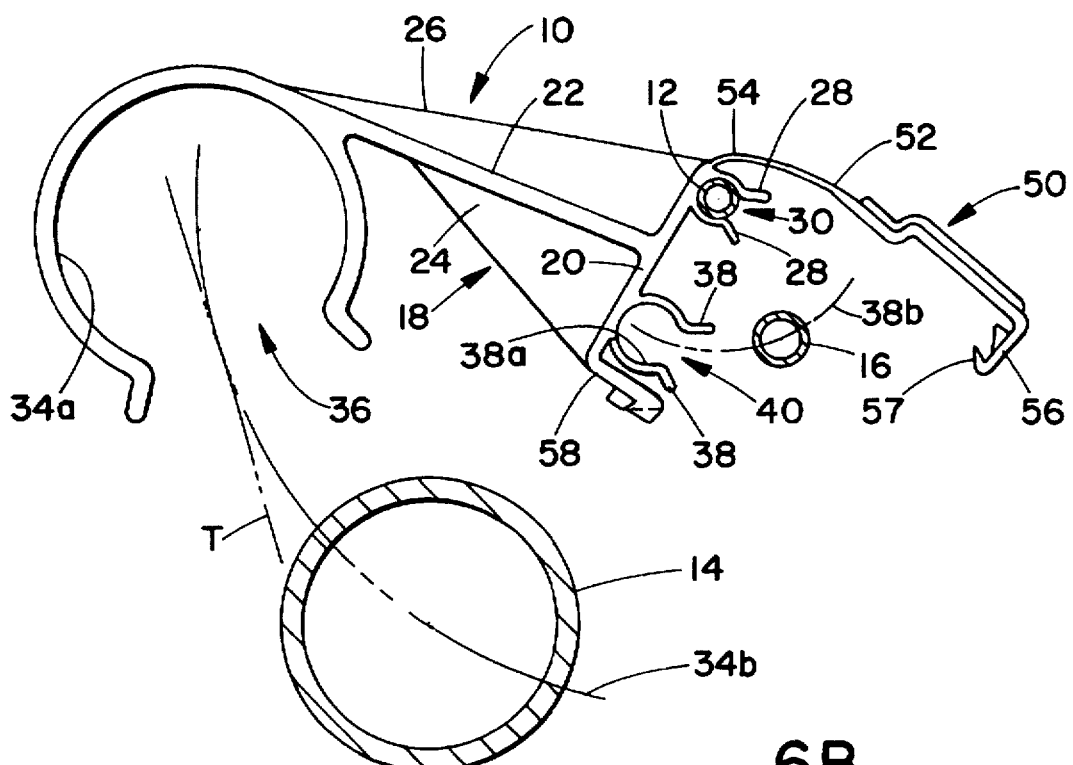
FIGS. 5 and 6 are views similar to FIG. 2 but showing the clip assembly during its installation.
Figure 6:
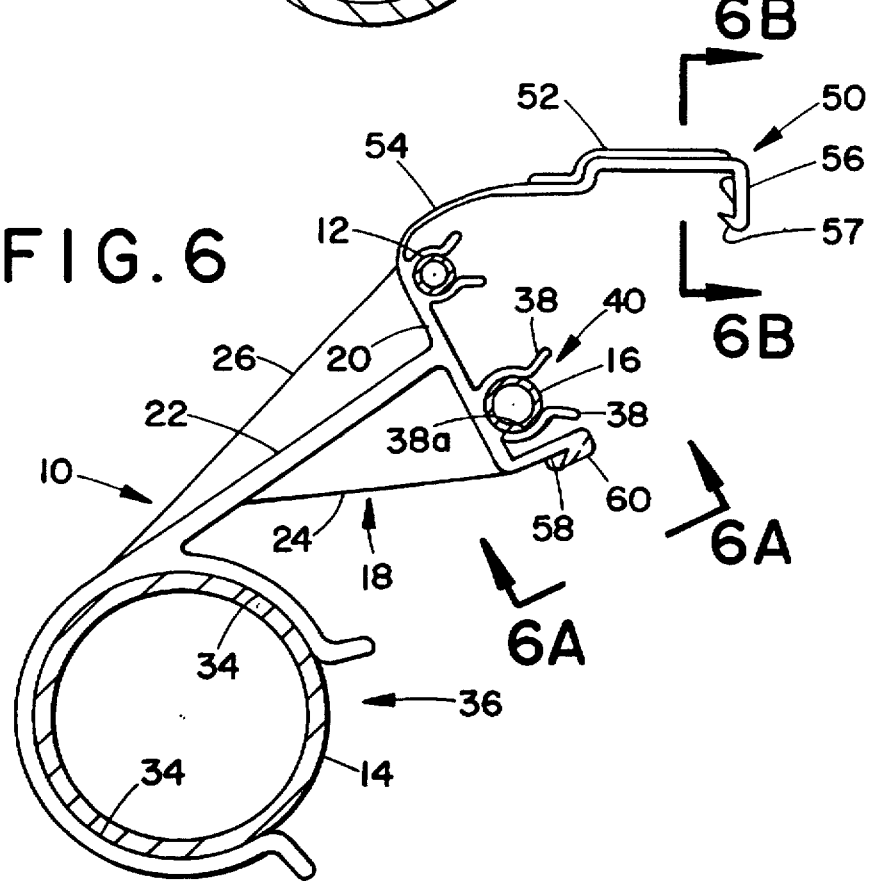

The advantages flowing from the noted arrangement can best be understood by reference to FIGS. 5 and 6. As shown in FIG. 5, during installation, the assembly 10 is first moved into position on tube 12 as shown. Thereafter, it is rotated counterclockwise (as viewed in FIG. 5) to the final located position of FIG. 6. Thus, the assembly is sequentially brought into its installed position on the two rigid tubes 12 and 14. With the final movement onto tube 14, or immediately thereafter, the tube 16 can be moved into its gripped position within arms 38. Subsequent thereto, the retaining means 50 is moved into engaged position overlying the tubes 12 and 16 to firmly retain them in position in their respective recesses. This entire installation is accomplished simply and rapidly without the use of tools and without placing any undue stress on the various tubes or the support element itself.

The invention has been described with reference to the preferred embodiment. Obviously, modifications and alterations will occur to others upon a reading and understanding of this specification. It is intended to include all such modifications and alterations insofar as they come within the scope of the appended claims or the equivalents thereof.

Having thus described the invention, it is claimed:

1. Apparatus for securing together a non-linear array of at least three tubes positioned with their longitudinal axes extending parallel, said apparatus attachable to said tubes and comprising:

a relatively rigid frame carrying first, second, and third cylindrical tube receiving and retaining recesses, each recess defined by a separate pair of opposed arms with at least one arm of each pair being resilient and deflectable in a radial direction relative to its respective recess, the arms in each pair having spaced end portions defining an entrance opening to the recess defined thereby;

first cylindrical tube receiving and retaining recess, having a center which is used to establish the center of imaginary circles with the centers of the second and third recesses being generally alignable to tangents to the imaginary circles;

said second cylindrical tube receiving and retaining recess, having its entrance opening generally alignable with a tangent to an imaginary circle with its center at the center of the first recess and its radius equal to the distance between the centers of the first and second recesses;

said third cylindrical tube receiving and retaining recess, having its entrance opening generally alignable with a tangent to an imaginary circle with its center at the center of the first recess and its radius equal to the distance between the centers of the first and third recesses;

the positions of the centers of the said first, second and third recesses are arranged so that the apparatus can be installed by rotating the frame about the center of the first recess when a tube is installed in the first recess to engage the second and third recesses with second and third tubes.

2. The apparatus as defined in claim 1 wherein the frame and the opposed arms of each pair are molded of plastic.

3. The apparatus as defined in claim 1 wherein each arm in each pair is radially deflectable relative to its respective recess.

4. The apparatus as defined in claim 3 including retaining means for selective engagement over at least some of the entrance openings to prevent undesired removal of tubes positioned therein.

5. The apparatus as defined in claim 4 wherein the retaining means comprises a flexible strap.

6. The apparatus as defined in claim 5 including a releasable connector for joining a terminal end of the strap to the frame.

7. The apparatus as defined in claim 1 wherein the frame is formed of a resinous resilient material and wherein the opposed arms are integral with the frame.

8. The apparatus as defined in claim 7 including retaining means associated with at least the first recess for selectively preventing removal of a tube from said first recess.

9. Apparatus for securing together at least three tubes positioned with their longitudinal axes extending parallel in a triangular array with respect to each other, said apparatus attachable to said tubes comprising:

a relatively rigid frame carrying first, second, and third cylindrical tube receiving and retaining recesses, each recess defined by a separate pair of opposed arms with at least one arm of each pair being resilient and deflectable in a radial direction relative to its respective recess, the arms in each pair having spaced end portions defining an entrance opening to the recess defined thereby;

said first cylindrical tube receiving and retaining recess, having a center of which is used to establish the center of imaginary circles with the centers of the second and third recesses being generally alignable to tangents to the imaginary circles;

said second cylindrical tube receiving and retaining recess, having its entrance opening generally alignable with a tangent to an imaginary circle with its center at the center of the first recess and its radius equal to the distance between the centers of the first and second recesses;

said third cylindrical tube receiving and retaining recess, having its entrance opening generally alignable with a tangent to an imaginary circle with its center at the center of the first recess and its radius equal to the distance between the centers of the first and third recesses;

the positions of the centers of the said first, second and third recesses arranged so the apparatus can be installed by rotating the frame about the center of the first recess when a tube is installed in the first recess to engage the second and third recesses with second and third tubes.

10. The apparatus as defined in claim 9 wherein the frame and the opposed arms of each pair are molded of plastic integrally with the frame.

11. The apparatus as defined in claim 10 wherein each arm in each pair is formed to be radially deflectable relative to the respective recess defined thereby.

12. The apparatus as defined in claim 9 including retaining means for selective engagement over the entrance openings to the first and third recesses to prevent undesired removal of tubes positioned therein.

13. The apparatus as defined in claim 12 wherein the retaining means includes a flexible strap carrying a releasable connection means at a terminal end for joining the strap to the frame.

14. In combination:

a rack and pinion power steering assembly including a rigidly mounted main housing tube with a rigidly mounted hydraulic return tube and a flexibly mounted hydraulic return tube extending parallel to the main housing with the axes of the three tubes forming a triangular array with respect to one another; and, an apparatus for securing and supporting the return tube and the pressure tube to the housing tube comprising a relatively rigid frame carrying first, second, and third cylindrical tube receiving and retaining recesses, each recess defined by a separate pair of opposed arms with at least one arm of each pair being resilient and deflectable in a radial direction relative to its respective recess, the arms in each pair having spaced end portions defining an entrance opening to the recess defined thereby;

a first cylindrical tube receiving and retaining recess, the center of which is used to establish the center of imaginary circles with the centers of the second and third recess being generally aligned to tangents to the imaginary circles;

a second cylindrical tube receiving and retaining recess, having its entrance opening generally aligned with a tangent to an imaginary circle with its center at the center of the first recess and its radius equal to the distance between the centers of the first and second recesses;

a third cylindrical tube receiving and retaining recess, having its entrance opening generally aligned with a tangent to an imaginary circle with its center at the center of the first recess and its radius equal to the distance between the centers of the first and third recesses;

the positions of the centers of the said first, second and third recesses such that the apparatus can be installed by rotating the frame about the center of the first recess when the pressure tube is installed in the first recess to engage the second and third recesses with the housing tube and return tube, respectively.

15. The combination as defined in claim 14 wherein the frame and the opposed arms of each pair are molded of plastic integrally with the frame.

16. The combination as defined in claim 15 wherein each pair is formed to be radially deflectable relative to the respective recess defined thereby.

17. The combination as defined in claim 14 including retaining means for selective engagement over the entrance openings to the first and third recesses to prevent undesired removal of tubes positioned therein.

18. The combination as defined in claim 17 wherein the retaining means includes a flexible strap carrying a releasable connection means at a terminal end for joining the strap to the frame.

* * * * *